US007010752B2

(12) United States Patent
Ly

(10) Patent No.: US 7,010,752 B2
(45) Date of Patent: Mar. 7, 2006

(54) METHOD FOR GRAPHICAL COLLABORATION WITH UNSTRUCTURED DATA

(75) Inventor: Eric Thichvi Ly, Sunnyvale, CA (US)

(73) Assignee: Enactex, Inc., Campbell, CA (US)

(*) Notice: Subject to any disclaimer, the term of this patent is extended or adjusted under 35 U.S.C. 154(b) by 513 days.

(21) Appl. No.: 10/170,992

(22) Filed: Jun. 13, 2002

(65) Prior Publication Data

US 2003/0206203 A1  Nov. 6, 2003

Related U.S. Application Data

(63) Continuation-in-part of application No. 10/138,706, filed on May 3, 2002.

(51) Int. Cl.
*G06F 17/00* (2006.01)
(52) U.S. Cl. ............... 715/769; 345/440; 345/751; 345/752
(58) Field of Classification Search ............ 715/769, 715/853; 345/440
See application file for complete search history.

(56) References Cited

U.S. PATENT DOCUMENTS 5,774,121 A * 6/1998 Stiegler ................. 715/769
6,188,403 B1 * 2/2001 Sacerdoti et al. ........ 715/764

* cited by examiner

*Primary Examiner*—Raymond J. Bayerl
*Assistant Examiner*—Dennis G Bonshock

(57) ABSTRACT

Briefly, the method for graphical collaboration with unstructured data provides multiple concurrent collaboration displays. One or more of the collaboration displays may be configured as a free-form display where a data object may be generated and viewed. Structure may be added to the data object by associating the data with one or more categories, where each category relates to a higher-level concept. Each collaboration display may use a selectable set of categories to display the data object. In this way, each collaboration display may be configured to view the data object with a desired level of structure. In a particular example, the data object may be added or modified in one of the collaboration displays, and that addition or change is indicated on the other collaboration displays substantially simultaneously.

24 Claims, 13 Drawing Sheets

| Add Label | | | $100K + | $50-100K | $10-49K | <$10K |
|---|---|---|---|---|---|---|
| X Catagory / Cost | Critical 61 | California 72 | Activity3 22 | | | |
| | Very High 62 | | | | | |
| Y Catagory / Priority Location | High 63 | Colorado 73 | Activity4 48 | | | |
| | | NewYork 74 | | | | Activity1 18 |
| | Medium 64 | | | | | |
| Catagories / Priority Location Cost | Low 65 | Iowa 75 | | | | Activity2 20 |
| | None 66 | | | | | |

| Add Label | | Activity1 | Activity2 | Activity3 | Activity4 | NONE |
|---|---|---|---|---|---|---|
| X Catagory / Activity | Critical 61 | | | Calif. | | |
| | Very High 62 | | | | | |
| Y Catagory / Priority | High 63 | N. York | | | Colo. | |
| Focus / Location | Medium 64 | | | | | |
| | Low 65 | | Iowa | | | |
| Catagories / Priority Location Cost | None 66 | | | | | |

30, 31, 32, 33, 34

METHOD FOR GRAPHICAL COLLABORATION WITH UNSTRUCTURED DATA

This application is a continuation-in-part of U.S. patent application Ser. No. 10/138,706, filed May 3, 2002, and entitled "Method for Graphical Classification of Unstructured Data", which is incorporated herein in its entirety.

BACKGROUND

The field of the present invention is electronic processing systems and methods for entering, manipulating, and using data collaboratively. More particularly, the present invention relates to a process operating on an electronic computer system for selectively and variably applying and using structure with associated data, and enabling collaboration with that data.

Many tasks require a person to creatively generate and manipulate data to solve problems. Often, people operate most creatively and flexibly with unstructured data. For example, brainstorming techniques exist where one or more people creatively generate ideas and data, and collect and view the brainstorming data in an open and sharing environment. Such an open and unstructured environment leads to highly creative and flexible solutions to complicated problems.

In working with highly unstructured data, it is common to use a chalkboard, whiteboard, or other informal mechanism to assist in generating, collecting, and presenting data. In this regard, the whiteboard or other data-receiving area is used to arrange and present individual pieces of data. For example, data may be written and arranged on the whiteboard, with individual pieces of data being erased and rewritten to facilitate a creative process. In another example, "sticky-notes" are used to capture individual data points, and then the notes are arranged on a note-receiving surface such as a whiteboard or corkboard. Moving and arranging such notes is easier and less time consuming than erasing and rewriting data directly on a whiteboard.

Although arranging notes on a whiteboard is conducive to creative and flexible idea generation, the whiteboard or other informal note arranging method does not facilitate easy long term collection or analysis of the data. Accordingly, computerized brainstorming environments have been developed. For example, "sticky note" software operates to allow one or more users to place notes on a computer screen in an emulation of a whiteboard environment. In this regard, the "sticky note" software enables more efficient long-term collection of data. Also, general outlining software and other such brainstorming tools are available to facilitate the collection of unstructured data. However, such outlining and brainstorming software tend to have a single, inflexible interface that every user must adapt to, regardless of the individual needs of a user.

Once the informal and creative process has generated sufficient data, the data typically must be structured and formalized to facilitate further analysis and use. For example, the informal and unstructured data may be entered into presentation software to facilitate management decisions. Alternatively, the unstructured data may be entered into more sophisticated computer software, such as project planning software, to assist in further problem solving. In this regard, sophisticated project planners are available that accept informal information and produce formal documents such as Gantt charts and PERT diagrams to facilitate project planning. Additionally, these project planners assist in setting priorities, allocating resources, and identifying a critical path. Although the known project planning software is quite sophisticated and useful, it is undesirably difficult to enter the unstructured data into the project planning software. Further, once the unstructured data has been entered into the structuring program, the data typically can only be manipulated by those sophisticated enough to operate the project planning software, which can be quite complicated. Accordingly, once the unstructured data has been entered into the more structured program, it becomes more difficult for some of the most creative users to conveniently view and work with the data.

More generally stated, adding a formal structure to data facilitates presentation and decision analysis. However, that very same structure often impedes creatively working with the data once the data has been structured. This is especially true for certain types of individuals. For example, some individuals operate most efficiently with more free-form thought processes, while others operate better with a high level of structure. Unfortunately, the "structure" people will generally be ineffective in using the free-form brainstorming tools, while the "free-form" people will be stifled when they hit the formality of the project planners. Accordingly, both the brainstorming systems and the project planners provide an undesirably inflexible operating environment.

Therefore, there exists a need for a process operating on a computer that allows for the creative generation, sharing and viewing of unstructured data, but yet enables convenient long-term collection and processing of that data. Further, there exists a need for a method of adding structure to the data and using the structure to facilitate decision analysis, but in a way so that the structure does not impede or interfere with the flexible and creative use of the data.

SUMMARY

It is therefore an object of the present invention to provide a collaborative free-form environment for generating, viewing, and flexibly arranging data. It is a further object of the present invention to enable the efficient collection of free-form data, and further to enable structure to be added and used in a manner that does not unduly interfere with the creative use of the data. Therefore, to overcome the deficiencies in the known systems and to meet the objects of the present invention, a method of collaborating with unstructured data is provided.

Briefly, the method for graphical collaboration with unstructured data provides multiple concurrent collaboration displays. One or more of the collaboration displays may be configured as a free-form display where a data object may be generated and viewed. Structure may be added to the data object by associating the data with one or more categories, where each category relates to a higher-level concept. Each collaboration display may use a selectable set of categories to display the data object. In this way, each collaboration display may be configured to view the data object with a desired level of structure. In a particular example, the data object may be added or modified in one of the collaboration displays, and that addition or change is indicated on the other collaboration displays substantially simultaneously.

Advantageously, each collaboration display may be configured to use an appropriate level of structure to view with the data to accommodate particular needs. By selecting and focusing on particular categories, each user may view the same data in a manner that is most effective for that particular user. A user thereby views only as much structure as needed to minimize complexity and ease the use and manipulation of the data. In this regard, each user of the collaboration system is able to easily adjust the level of viewed structure to facilitate efficient use and analysis of the data. The user then views and uses the data using a customized level of structure. Accordingly, the process enables the structure to facilitate use of the data by multiple concurrent users, but yet keeps the structure from impeding creativity.

BRIEF DESCRIPTION OF THE DRAWINGS

FIG. 7 shows a data arrangement having a third x-axis category;

FIG. 8 shows the data objects classified according to the third x-axis category;

FIG. 9 shows data objects arranged with two categories on the y-axis;

FIG. 10 shows a data arrangement with a new focus category;

DETAILED DESCRIPTION

Figure 1:
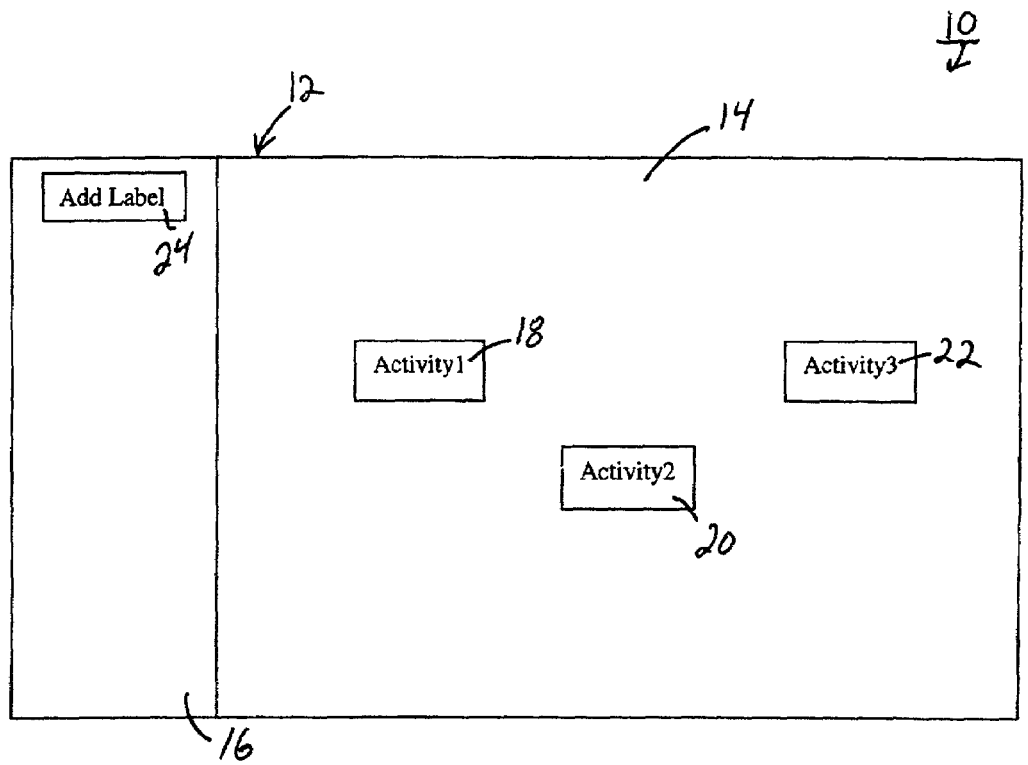
FIG. 1 shows a diagram of an unstructured data arrangement in accordance with the present invention.

Referring now to FIG. 1, a computerized process facilitating graphical classification of unstructured data is illustrated. FIG. 1 shows the process emulating the familiar "whiteboard" environment, and enables a user to generate, place, and move simulated "sticky-notes" on the whiteboard. The process, therefore, uses the whiteboard and sticky-note as efficient and comfortable metaphors to develop a graphical user interface. However, the electronic process enables a level of creatively, synthesis, and analysis not available using known systems. It will be appreciated that although the process of FIG. 1 is styled after the traditional whiteboard and sticky-note, other useful metaphors may be substituted consistent with this disclosure.

More particularly, FIG. 1 shows a data arrangement in the form of a whiteboard environment 10 for adding and manipulating unstructured data. The unstructured data is presented as "sticky-notes", or text boxes, that can be freely moved about the whiteboard display area. Such a free-form process for generating, moving, and viewing data facilitates a creative and efficient brainstorming environment.

The whiteboard environment 10 includes a computer screen display 12 having a data arrangement area in the form of a whiteboard 14 and a command area 16. Data objects may be added into the whiteboard area 14. In a particular example, the data objects may be in the form of notes such as notes 18, 20, and 22. It will be appreciated that additional notes may be added by graphical interaction with the data arrangement area 14, or alternatively by activating the add label command 24. For example, a user may graphically select the add label command 24 and a box representing an empty note may be presented. The user may enter text or other information into the presented box, and when complete, the note would appear as a data object in the whiteboard 14.

Advantageously, a user may interact with the notes 18, 20, and 22 in a freeform and creative way. In this regard, a user may use a graphical interaction device, such as a mouse or other pointing device to arrange, add, and delete notes to facilitate a creative thought process. Indeed, the electronic process is constructed to advantageously use graphical interactions, such as dragging and dropping functions, for facilitating ease of use and efficient interactions.

Although whiteboard area 14 is shown to be of limited size, it will be appreciated that the whiteboard area 14 may be of varying sizes. For example, the whiteboard presentation may allow for vertical or horizontal scrolling to allow a great number of notes to be presented on a single whiteboard. It will also be appreciated that although the data arrangement area is shown in the form of a whiteboard simulation, that other freeform data input areas are contemplated.

The whiteboard area 14 may provide various familiar tools to facilitate adding additional notes. For example, the whiteboard area 14 may allow for grids, snaps, and glue for more conveniently arranging notes. It will also be appreciated that notes may be added of different size and of different format. For example, some notes may be purely textual, while others may contain numbers, graphics, sound, or video. The whiteboard environment 14 may also provide for linking notes together, such as with lines or other connection mechanisms. At a later time, such connections may be used to track relationships between notes.

Although the whiteboard area 14 enables a flexible and convenient way to view and manipulate unstructured data, it may be useful to enable the user to add additional structure to facilitate organization and analysis. For example, the data may be synthesized to establish relationships and connections with higher-level concepts. More particularly, the process of synthesizing may be considered a process of categorizing the data according to defined criteria. Using the graphical whiteboard environment, a user associates individual data objects, such as data notes, with regard to defined categories.

A category relates to a particular high-level concept for the data. For example, "priority" may be a high-level concept that can be assigned to a category. The "priority" category may be further defined by providing a set of available "labels" for the category. For example, labels for the priority category may set aspects of the high-level concept to be "high", "medium", and "low". The whiteboard environment 10 may provide a set of predefined categories, with each category having predefined labels. The whiteboard environment 10 may also provide for the customization of the predefined categories and labels, and may further provide for the creation of new categories and associated labels.

Figure 2:
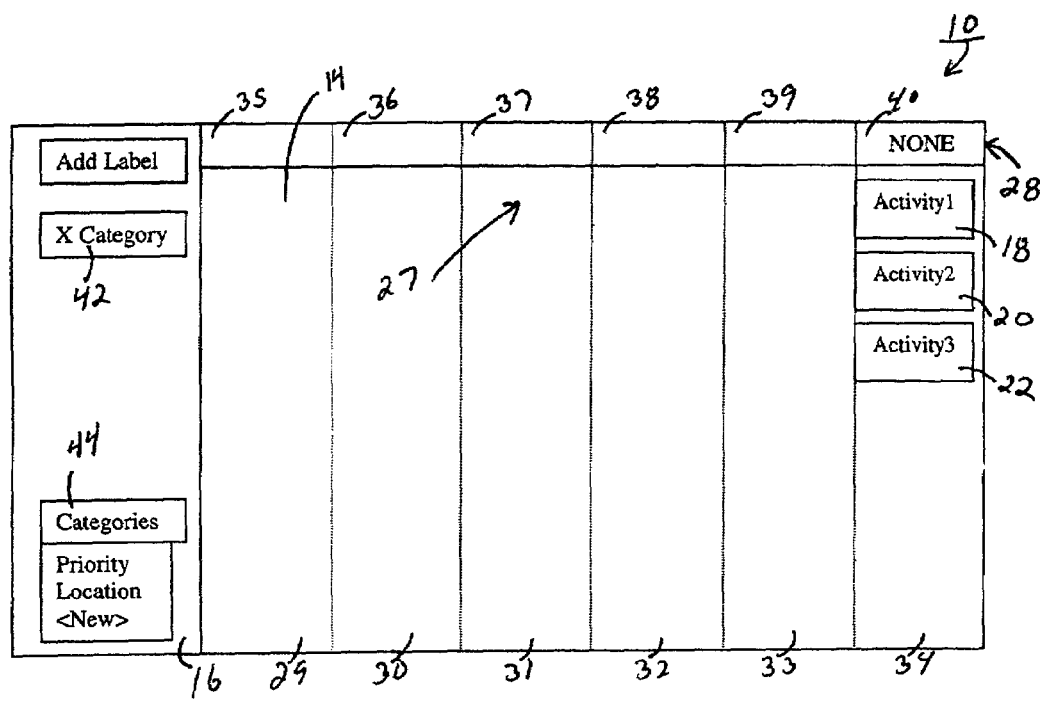
FIG. 2 shows a data arrangement with unclassified data objects.

The process of synthesizing the data entails selecting a category and associating data with that category's labels. In this regard, FIG. 2 shows that an x-axis 27 has been added to the whiteboard area 14. The x-axis is divided into several x-axis columns, such as x-axis columns 29, 30, 31, 32, 33, and 34. Each of the x-axis columns has an associated x-axis column label 35, 36, 37, 38, 39 and 40, respectively. Together, the x-axis column labels provide a row of labels 28. Categories may be selected from a group of predetermined categories 44 or may be created by the user. To select a category, a user may select one of the available categories from the category bin 44 and place that category into the x-category indicator 42. For example, a user may select the "priority" category to begin organizing the notes. When the x-axis 27 is first positioned on the whiteboard area 14, the notes 18, 20, and 22 will not yet have been classified. Therefore, the notes appear under the x-axis column heading 40 that indicates no classification to those notes.

When the user selects the "priority" category from the category selection bin 44 and places it on the x-axis indicator 42, the labels associated with the priority category are shown along the x-axis. More particularly, the labels associated with the priority category now appear in the row of labels 28. These labels may be predefined or may be defined by the user.

Figure 3:
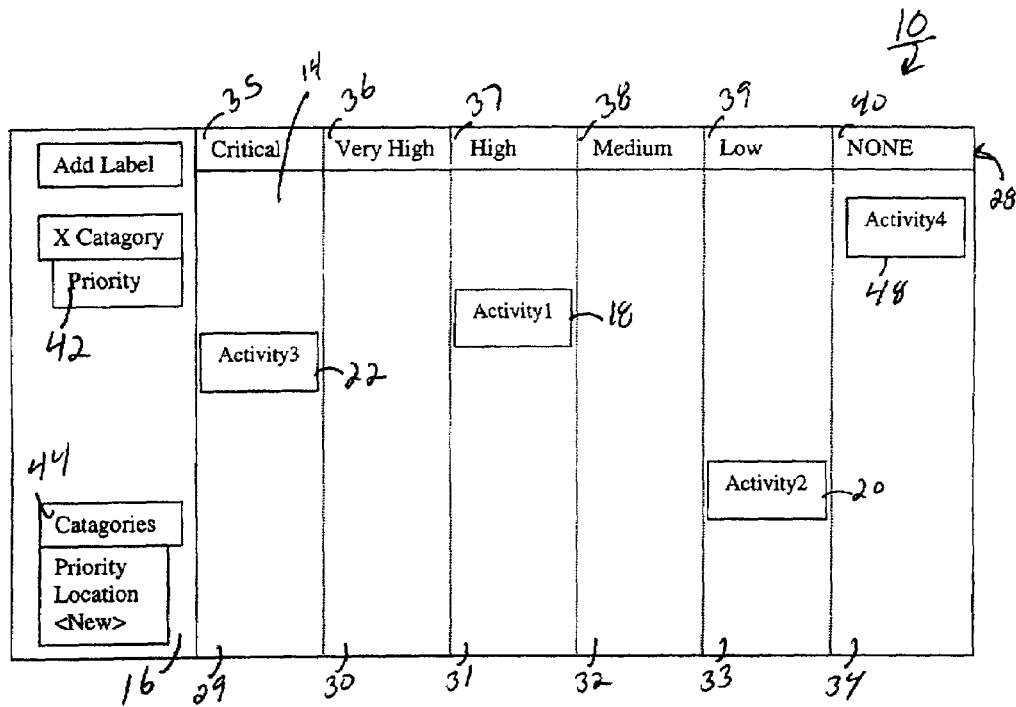
FIG. 3 illustrates classifying data objects by graphically associating the data objects with a category.

As shown in FIG. 3, various levels of priority are indicated by the labels in the row of labels 28. For example, column 29 is labeled "critical", column 30 is labeled "very high", column 31 is labeled "high", column 32 is labeled "medium", and column 33 is labeled "low". As previously discussed, column 34 shows notes that are not yet classified.

Using an intuitive and efficient graphical method, the data notes may now be associated with a particular priority label. For example, a user graphically may select a note, such as note 18 and drag it from column 34 to column 31. When the note is in column 31, the user drops and places the note. In this regard, the data note holding "activity 1" now is associated with a high priority. In a similar manner FIG. 3 shows that the data note holding "activity 2" is associated with a low priority, and the data note holding "activity 3" is associated with a critical priority. FIG. 3 also shows the user having generated a new data note 48 holding "activity 4". When first created, "activity 4" 48 appears in the column 34 associated with a label of "none." Of course, the user may move activity 4 48 into a labeled column to associate "activity 4" with a particular label, or may leave the data note 48 unassigned in the "none" column.

Figure 4:
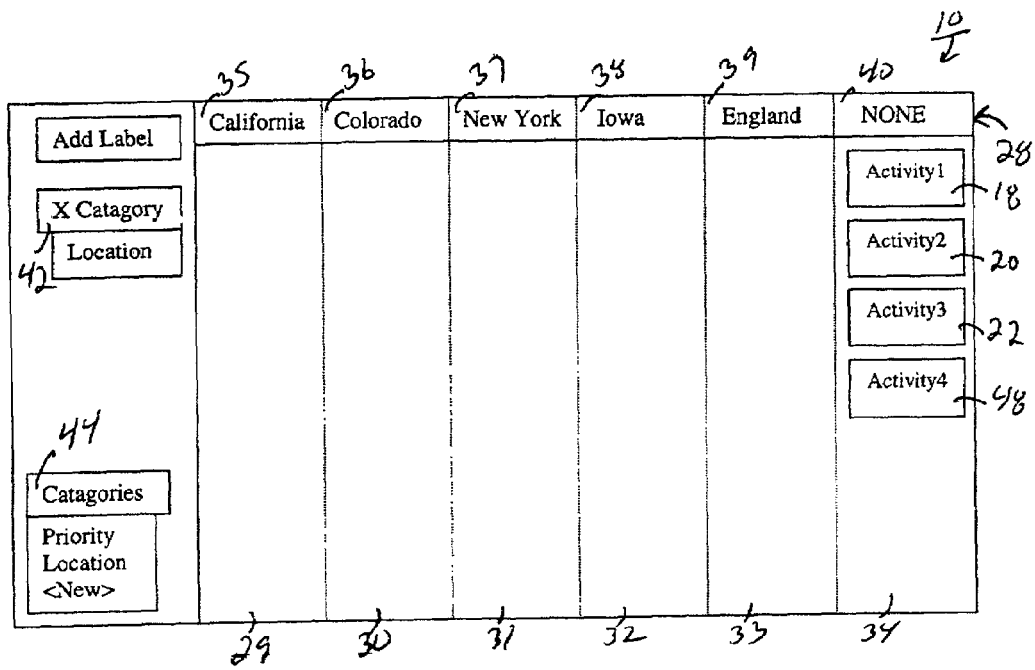
FIG. 4 shows data objects in conjunction with another x-axis category.

As shown in FIG. 3, a user may easily and conveniently uses a graphical classification method to associate data with a first category. Referring now to FIG. 4, the same notes as used in FIG. 3 are classified in another category. More specifically, the category "location" is selected from the category selection bin 44 and placed in the x-category indicator 42. The row of labels 28 now indicates various locations that are either predefined or generated by the user. For example, column 29 now indicates California, column 30 now indicates Colorado, column 31 now indicates New York, column 32 indicates Iowa, and column 33 indicates England. Column 34 is reserved for unclassified activities.

When "location" is first selected as a category, all activities would be assigned to column 34 as having no classification. It will be appreciated, that other default labels may be used for a particular category.

To classify each of the notes 18, 20, 22, and 48 according to location, a user graphically selects each note and drops it into the appropriate column. Even though the described process uses a dragging and dropping technique, it will be appreciated that other association process may be used. For example, a note may be cut from one column, and then copied to another column. In another example, selecting a note may access a "move to" tool that allows a user to specify a new location for the data note. To classify "activity 1" as to the "location" category, a user graphically selects and drags activity 1 18 from column 34 to column 31 to indicate activity 1 is to take place in New York. In a similar manner, the data note holding "activity 2" 20 is moved from column 34 to column 32 to indicate the activity should take place in Iowa, and the data note holding "activity 3" 22 is moved to column 29 to indicate it should take place in California. Also, a data note may be associated with more than one label for a particular category. For example, activity 1 18 may be graphically dropped into column 31 to indicate activity 1 is to take place in New York, as described above. Further, "activity 1" can be duplicated and graphically dropped into column 32 to indicate activity 1 also is to take place in Iowa. Accordingly, the "activity 1" data note will be presented in two columns. It will be appreciated that a data note may be duplicated using alternative techniques, such selecting and dragging while pressing the "alt" key, or using a menu or key method to "copy" and "paste" the data note.

Figure 5:
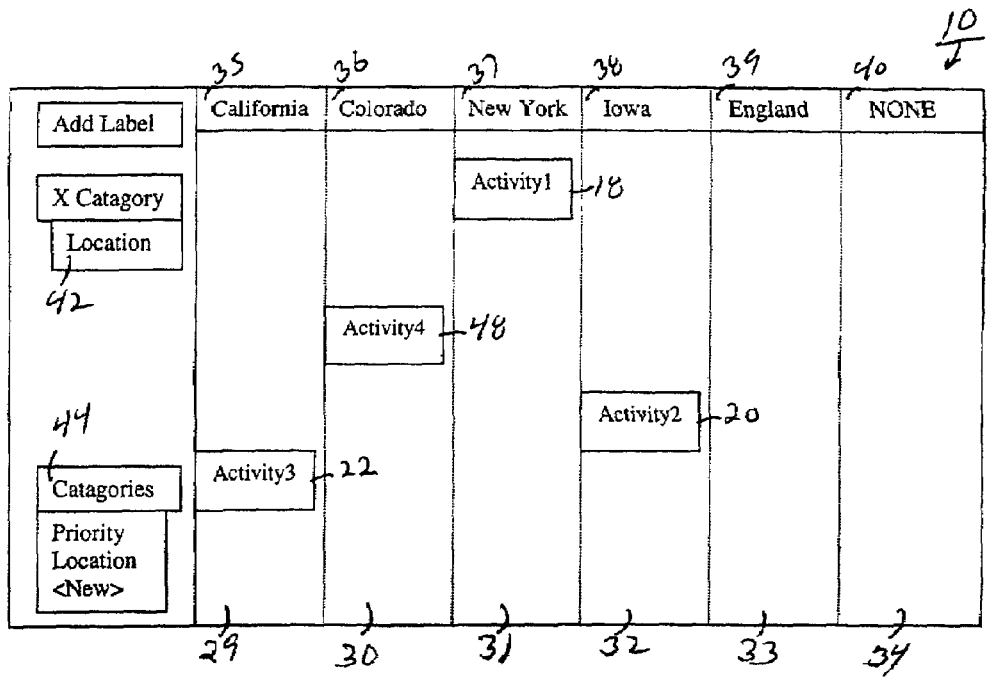
FIG. 5 shows data objects classified according to another x-axis category.

Each of the notes 18, 20, 22, and 48 are now associated and classified with two categories: location and position. However, FIG. 5 shows that a user may select less than all the available categories to view and manipulate data. Such flexibility facilitates ease of use and focuses attention for a particular need. For example, a person interested in defining the location for selected activities may not have an interest in viewing priority, and may even find that viewing the priority structure interferes with efficient use of the data. In this regard, a user is able to display only as much structure as needed when inputting, manipulating, and analyzing data notes.

Figure 6:
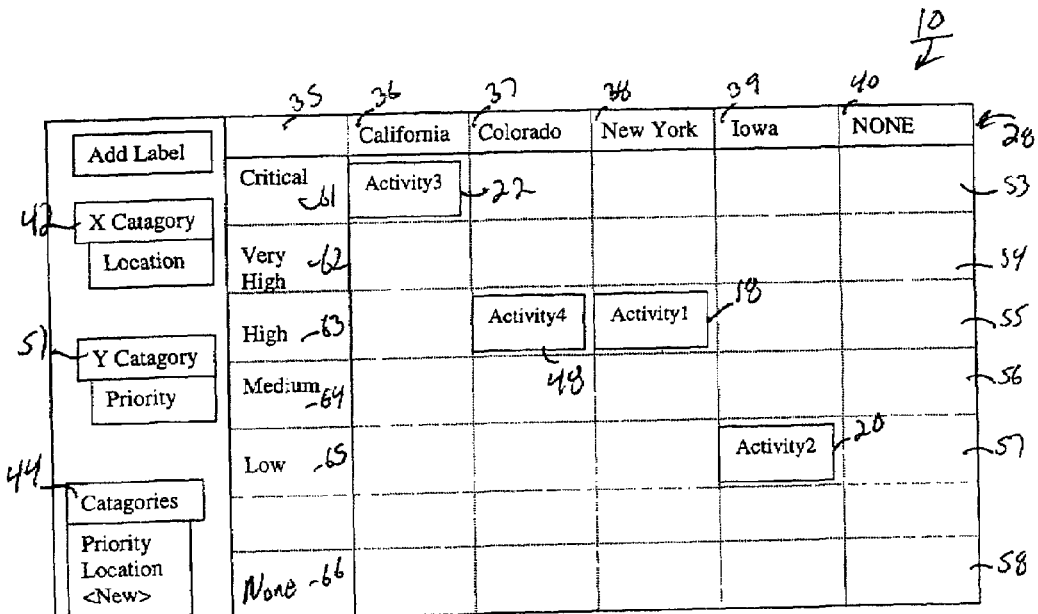
FIG. 6 shows data objects arranged in a two-dimensional display.

There are times when the display of additional structure may facilitate viewing and manipulating data. For example, sophisticated users may be comfortable and confident dealing with data in a more structured environment. In this regard, FIG. 6 shows the data arrangement 10 having both an x-axis category 42 and a y-axis category 51. Y-axis category 51 has also been selected from category selection control 44. In FIG. 6, Y category 51 has been selected to be "priority". In this regard, a column of labels 60 has been provided indicating the defined levels of priority. For example, row 53 has a label of "critical" 61, row 54 has a label of "very high" 62, row 55 has a label of "high" 63, row 56 has a label of "medium" 64, and row 57 has a label of "low" 65. Any note or activity not having an assigned priority would be placed in row 58, which has a label of "none."

When the Y category 51 is selected to be "priority" and the X category is selected to be "location", a two-dimensional grid is displayed on the whiteboard. Each note is displayed in a grid cell to indicate how that note has been classified as to each of the two categories. For example, activity 1 18 shows that it is a high priority in New York, activity 2 is a low priority in Iowa, activity 3 is a critical priority in California, and activity 4 is a high priority in Colorado. It will be appreciated that the user may graphically move an individual note to a new grid location, and thereby change that data's association with one or two categories simultaneously. For example, activity 1 18 could be moved according to move 19 to change activity 1 from a high priority in New York to a very high priority in Iowa. Such a two-dimensional grid structure facilitates sophisticated users viewing and adjusting associations to more than one category at a time.

Figures 7, 8:
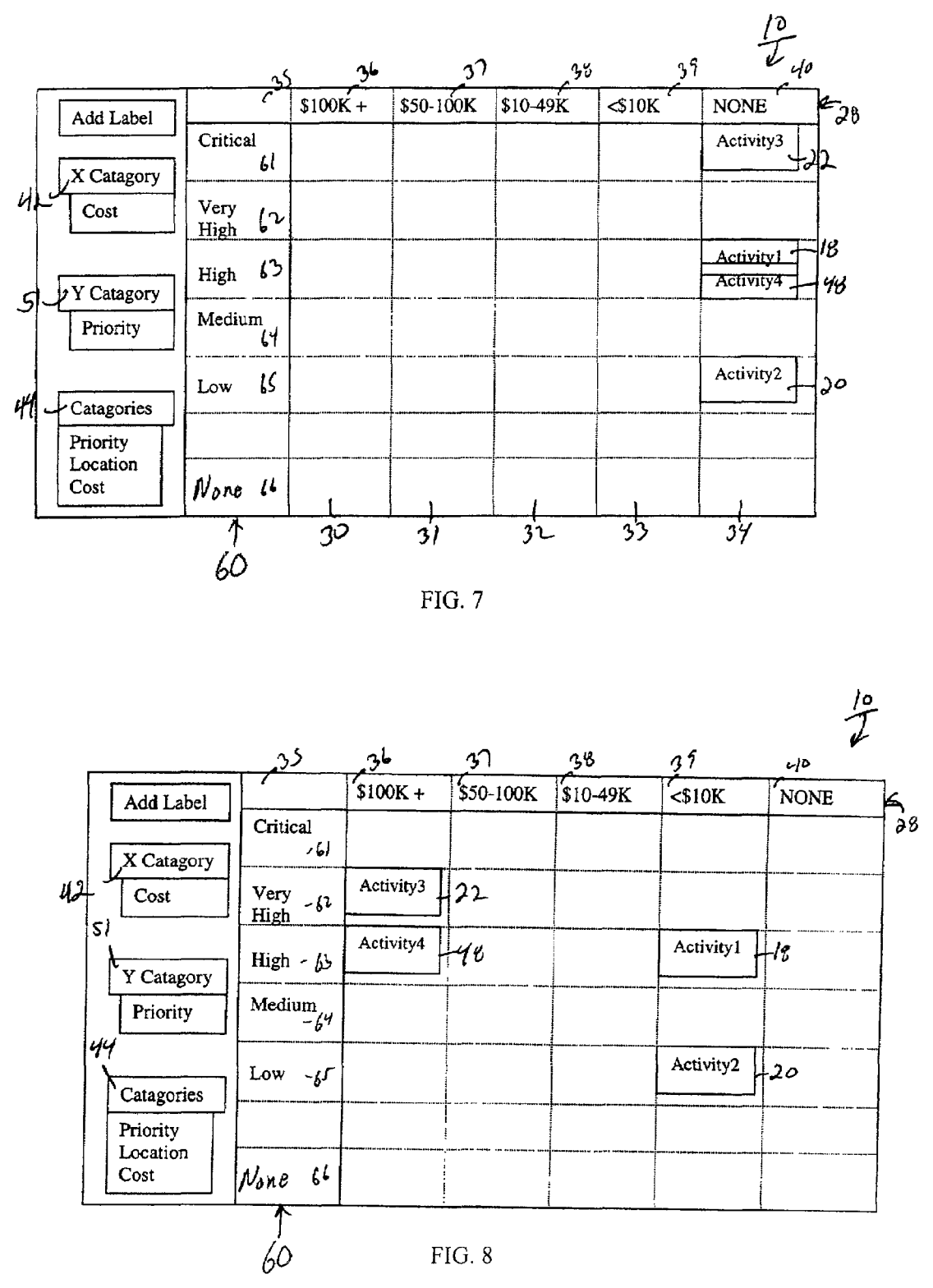

FIG. 7 shows another two-dimensional display with the priority category still positioned on the Y category 51, but with a new category, "cost", displayed on the X category. In this regard, the row of labels 28 indicates varying levels of cost to associate with an individual activity. When cost is first added as an X category, all the activities will be displayed in the "none" column 44. Since both activity 1 18 and activity 4 48 are at a high priority, both appear in the same grid position. Although the data notes in FIG. 7 are not yet classified according to cost, priority is indicated by each data note's association with the y-axis. In this regard, a person classifying the activities for cost will receive a visual indication if higher priority activities are funded to a higher degree. Such information may facilitate a decision to increase or decrease funding depending on the priority of an individual activity. FIG. 8 shows that the activities have been classified according to cost. Each of the data notes holding activities 1–4 has now been classified in three categories. As previously described, a user may select to display 0, 1, or 2 categories to facilitate adding, modifying, and analyzing data.

However, it may be useful to display even more structure with the data. For example, FIG. 9 shows that the y-axis now has two categories. A column of labels 60 indicates priority, while a column of labels 71 indicates location. In this regard, the Y category indicator 51 shows that both priority and location are shown on the y-axis. The x-axis indicator shows that the x-axis shows cost. In this arrangement, each of the notes now indicates its association with all three categories. For example, activity 1 18 shows that it is a high priority in New York with a cost less than $10,000. In a similar fashion, activity 4 48 shows that it is a high priority in Colorado with a cost more than $100,000. Using such multi-category display, a user now may graphically adjust three categories at a time. It will be appreciated that additional categories can be added to both the x- and the y-axes to facilitate even more complex and sophisticated arrangements of data.

In another example of displaying additional structure, an individual data note may, for example, be assigned a particular size, shape, or color to indicate an association. For example, rather than having cost displayed on an axis, each cost label could be associated with a different color. In this way, additional structure may be displayed and used in the analysis process. In another example, each "priority" label could be associated with a particular size of a note. Now, each data note could indicate an association based on its color, its size, its relationship with the X axis, and its relationship with the Y axis. Accordingly, the level of structure viewed with the data can be increased to suit the needs and capabilities of almost any user.

FIG. 10 illustrates another process for creatively and innovatively viewing and manipulating data. FIG. 10 shows that the data display has a new focus 80. Previous FIGS. 1–9 have had the data notes displaying "activities" as their focus. Now in FIG. 10, the "location" category has been changed to the focus. In changing focus to "location", each location label is assigned to a new data note, and displayed according to its existing associations. For example, the label "New York" becomes data note 81, label "California" 82 becomes data note 82, label "Colorado" becomes data note 84, and label "Iowa" becomes data note 83. Conversely, each "activity" data note now becomes a label for an "activity" category. More particularly, the "activity 1" data note becomes label 36 for the activity category, the "activity 2" data note becomes label 37, the "activity 3" data note becomes label 38, and the "activity 4" data note becomes label 39.

The "activity" category may be used as any other category. For example, the activity category may be assigned to the x-axis as shown by x-axis indicator 42. The two-dimensional display of FIG. 10 displays how the "location" data notes are associated relative to the "activity" category and the "priority" category. For example, New York has a high priority when associated with activity 1, and California has a critical priority when associated with activity 3. Allowing a user to easily and quickly change the focus of the data enables data to be viewed in highly innovative and creative ways. As in other previously described displays, more or fewer categories may be displayed depending upon individual user needs.

Figure 11:
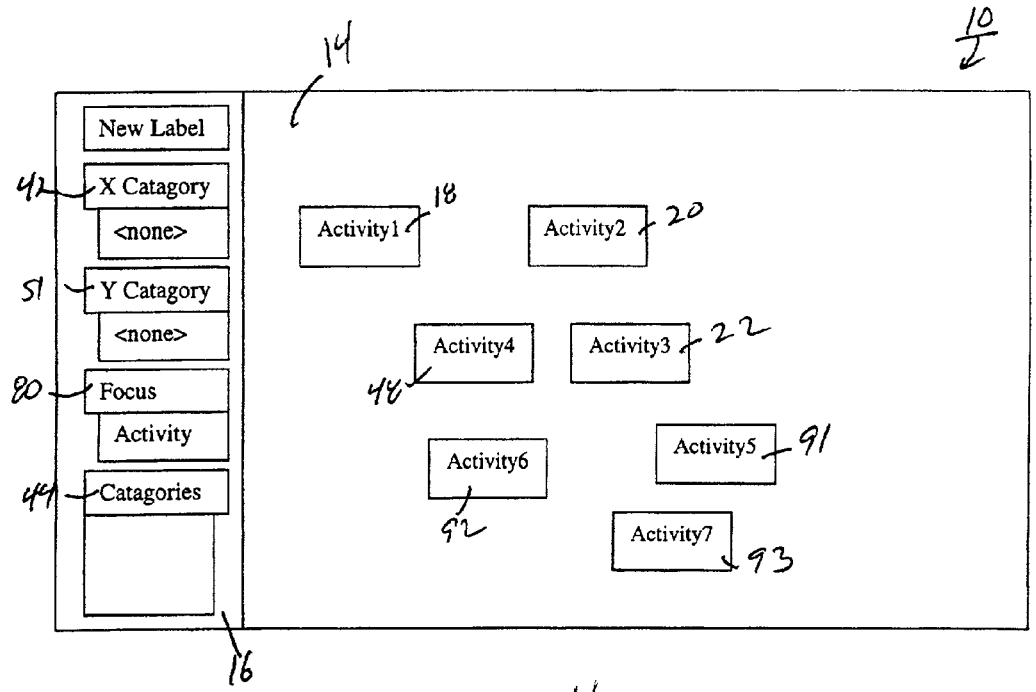
FIG. 11 shows the data objects displayed in an unstructured environment.

Although the data notes described to this point have been classified in three categories, some users may find that viewing additional categories impedes the creative use of the data. Accordingly, FIG. 11 shows that the data notes may be displayed without their associated structure, even though they retain their underlying associations. More particularly, the X category indicator 42 indicates that there is no category on the x-axis and the Y category indicator 51 indicates that there is no category assigned to the y-axis. The focus 80 is shown to be back on the activity. Since associations are no longer displayed, data notes may be added, moved, and edited in a free-form unstructured whiteboard environment. In this regard, the data may be used without interference from complicating structure. However, structure may be selectively added, viewed and used as desired by a user. FIG. 11 shows that new notes 91, 92, and 93 have been added to the unstructured whiteboard environment 14. Of course, these new notes 91, 92, and 93 have not been classified in any of the available categories.

Figure 12:
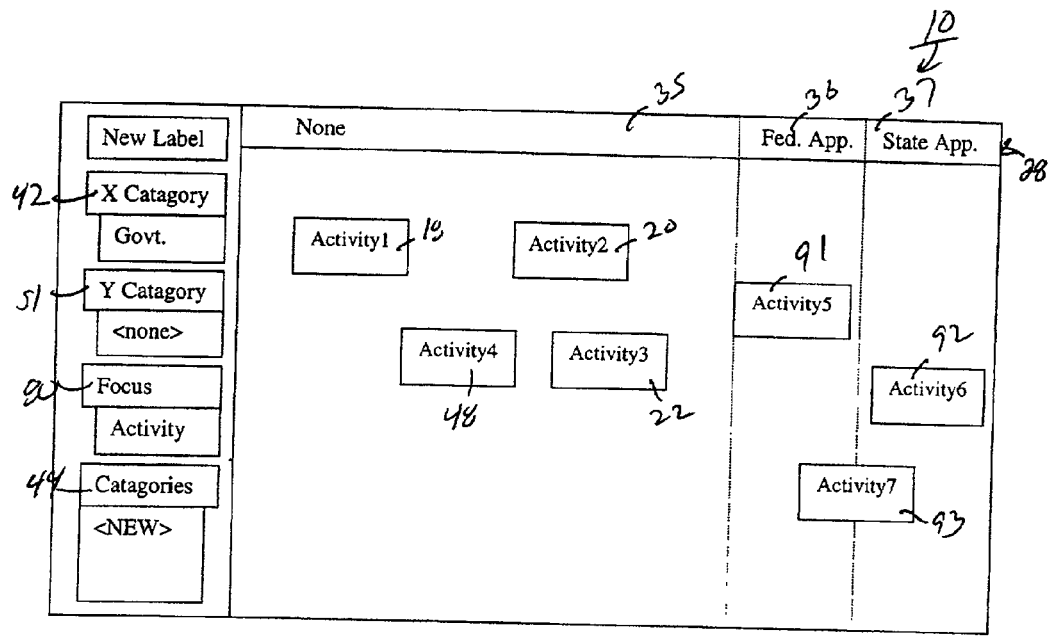
FIG. 12 shows a data arrangement with a new category defined.

Referring now to FIG. 12, the whiteboard display 14 is shown with the user defining a new category. In this example the user uses the category selector 44 to define a new category of "government" and assigns government to the X axis, as indicated in the X-axis indicator 42. Using the "new label" key 24, the user adds a label of "federal approval" 36 and "state approval" 37 into the row of labels 28. Label 35, "none", is used to indicate data notes that are not classified as to the government category. The user then may graphically move various data notes, such as notes 91, 92 and 93 into the appropriate column to indicate its classification as to government approval. Since this user was only interested in government approvals, the display is simplified so that priority, location, and cost do not interfere with the user's adding and classifying data. Note that activity 7 93 requires both federal approval and state approval and therefore straddles two columns. It will be appreciated that other mechanisms may be used to allow a particular note or activity to be classified in more than one column.

Figure 13:
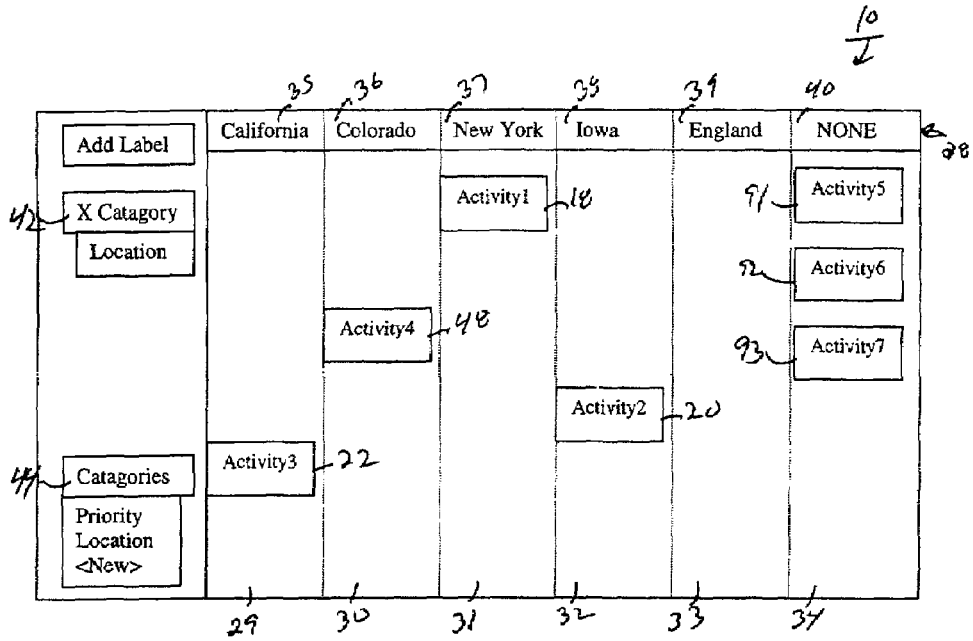
FIG. 13 shows another view of the data objects of FIG. 12.

FIG. 13 displays the data notes from FIG. 12, but with additional structure viewed. More particularly, "location" is selected as the X axis category 42. The row of labels 28 therefore displays each label for "location" in a column, and each data note is displayed in the column according to its existing association. Since notes 91, 92, and 93 were recently added, they first appear in column 34 with no location assigned.

Figure 14:
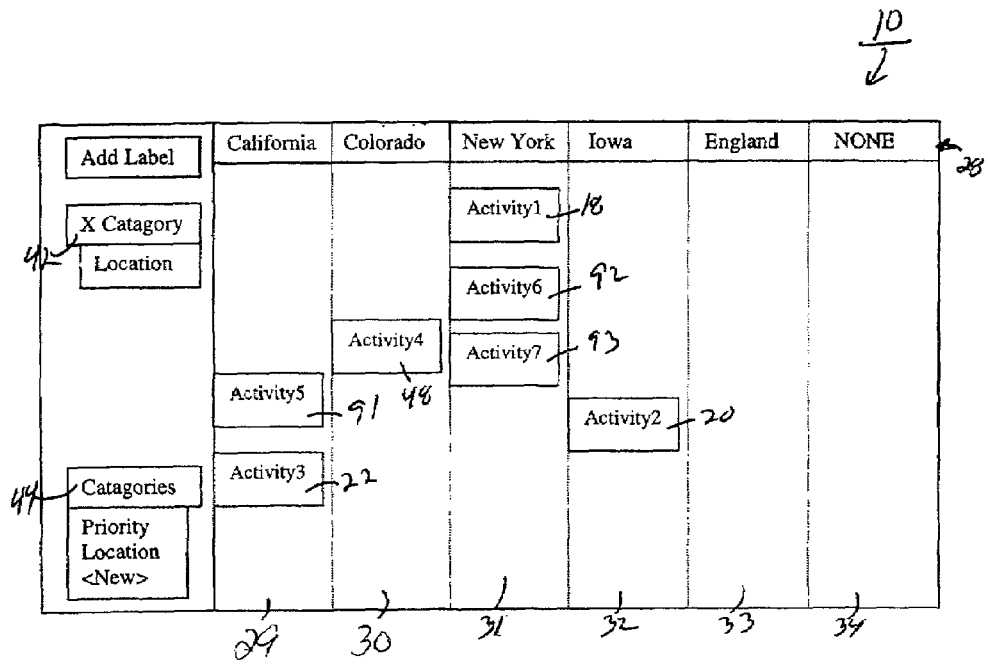
FIG. 14 shows data graphically classified.

FIG. 14 shows that a user may then graphically move the new data notes into the appropriate columns to classify each data note according to location. For example, data note 91 was moved from column 34 to column 29 to indicate it will be performed in California. In a similar manner data notes 92 and 93 have both been moved into column 31 to indicate they will be performed in New York. Significantly, the user who is assigning location is not encumbered by the government, cost, or priority structure. However, it will be appreciated that these categories could be displayed if desirable for that particular user.

Figure 15:
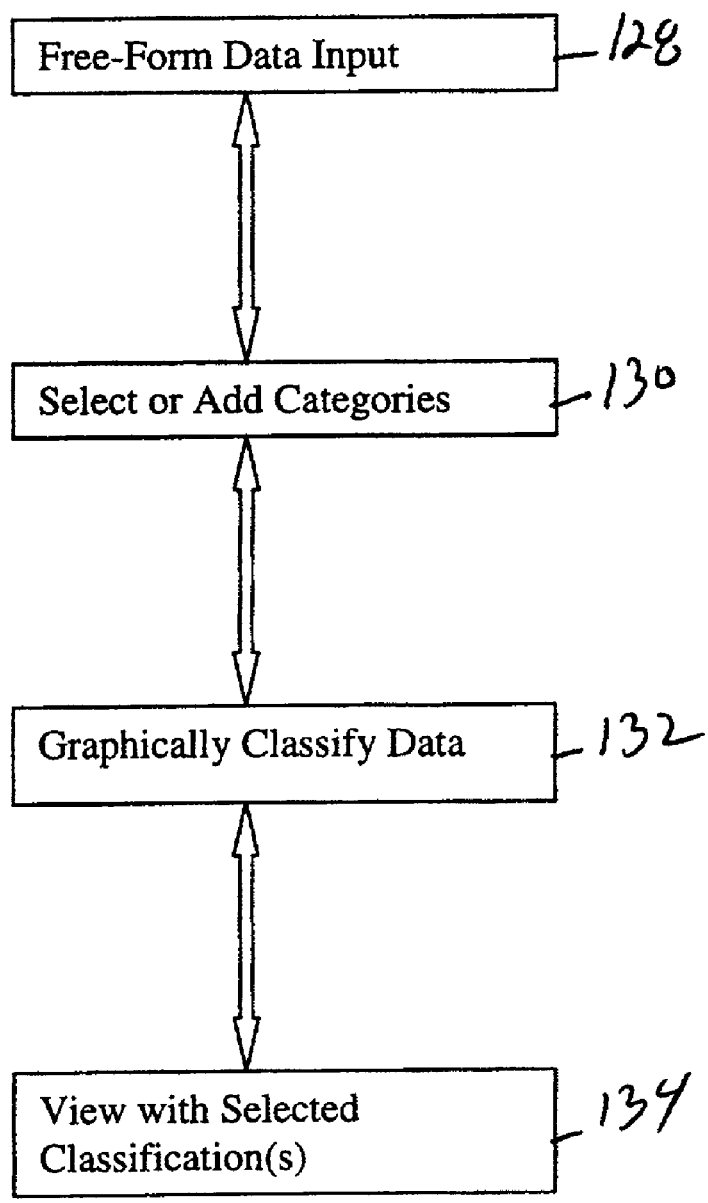
FIG. 15 shows a general flowchart of a method for graphically classifying unstructured data in accordance with the present invention.

Referring now to FIG. 15 a method for classifying data 125 is illustrated. Method 125 has a free-form data input block 128 where a user inputs data into an unstructured environment, such as a white-boarding display. It will be appreciated that other unstructured data input mechanisms may be used. Block 130 indicates that categories may be selected or added. The method 125 may have one or more predefined categories. For example, a category for "priority" may be predefined, including several predefined labels. Additionally, a user may generate a new category and assign appropriate labels in an interactive manner. Also, the addition of categories may occur during the data input of block 128. In this regard, a user may define additional labels for an existing category, or may define categories and labels responsive to immediate needs as data notes are input. Such flexibility enables the capturing of important structure information as the information is generated.

The categories of 130 may then be used to display associations or other structure. It will also be appreciated that a user may select and display only those categories of interest. Once the categories are presented, the user graphically classifies the data in block 132. In one example, a user may use a mouse or other pointing device to graphically select and move a data note to establish an association between the data note and a particular category. Accordingly, the user graphically adds classification information to the data.

As additional structure and classification is added to the data notes, the user can view the data notes with more or less structure as indicated in block 134. For example, a user may choose to display several categories at once to facilitate sophisticated viewing, analysis, and modification of the data. Alternatively, the user may choose one or no categories for display to enable more free-form thinking or to display a simplified interface.

Figure 16:
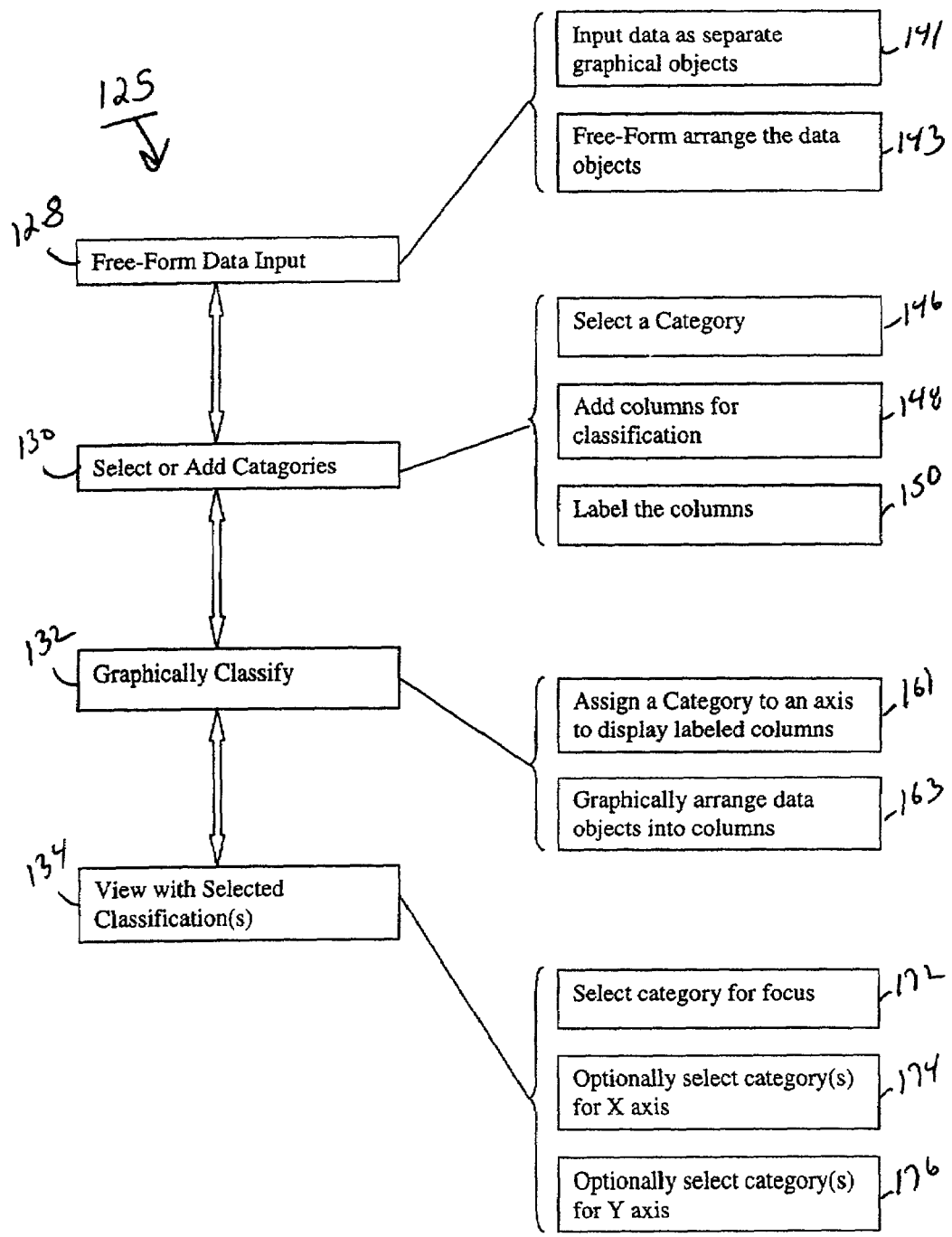
FIG. 16 provides more detail to the flowchart of FIG. 15.

FIG. 16 describes additional detail to method 125. For example, block 128 is expanded to show that individual data notes may be input as separate graphical objects 141. For example, each data note may be generated and positioned as a "sticky-note" on a whiteboard display environment. It will be appreciated that other free-form input mechanisms or metaphors may be used. Once the free-form data has been input into the system, the data then may be arranged graphically as indicated in block 143.

Block 130 is shown to comprise selecting a category in block 146. The category selection may include a predefined category or the user may choose to add a new category. Once a category has been selected, columns may be added for classification. For a simple classification, a small number of columns such as two may be selected. For more sophisticated classifications, several columns may be needed. As shown in block 150, each of the columns has an associated label.

Graphical classification 132 may be accomplished by assigning a category to an axis and displaying the labeled columns as indicated in block 161. The user may then graphically arrange the data objects, such as the notes, into these columns to classify the data.

Viewing and manipulating data as shown in block 134 may be accomplished by selecting a category for focus 172. As described earlier, each of the categories may be alternatively selected to be a focus of the display. In this regard, new and innovative ways of viewing data may be accomplished. Blocks 174 and 176 show that categories then may be assigned to the x-axis and y-axis. For simple displays a small number of categories, such as 0 or 1 may be assigned to an axis, while a more complex display may define two or more categories to each axis.

Figure 17:
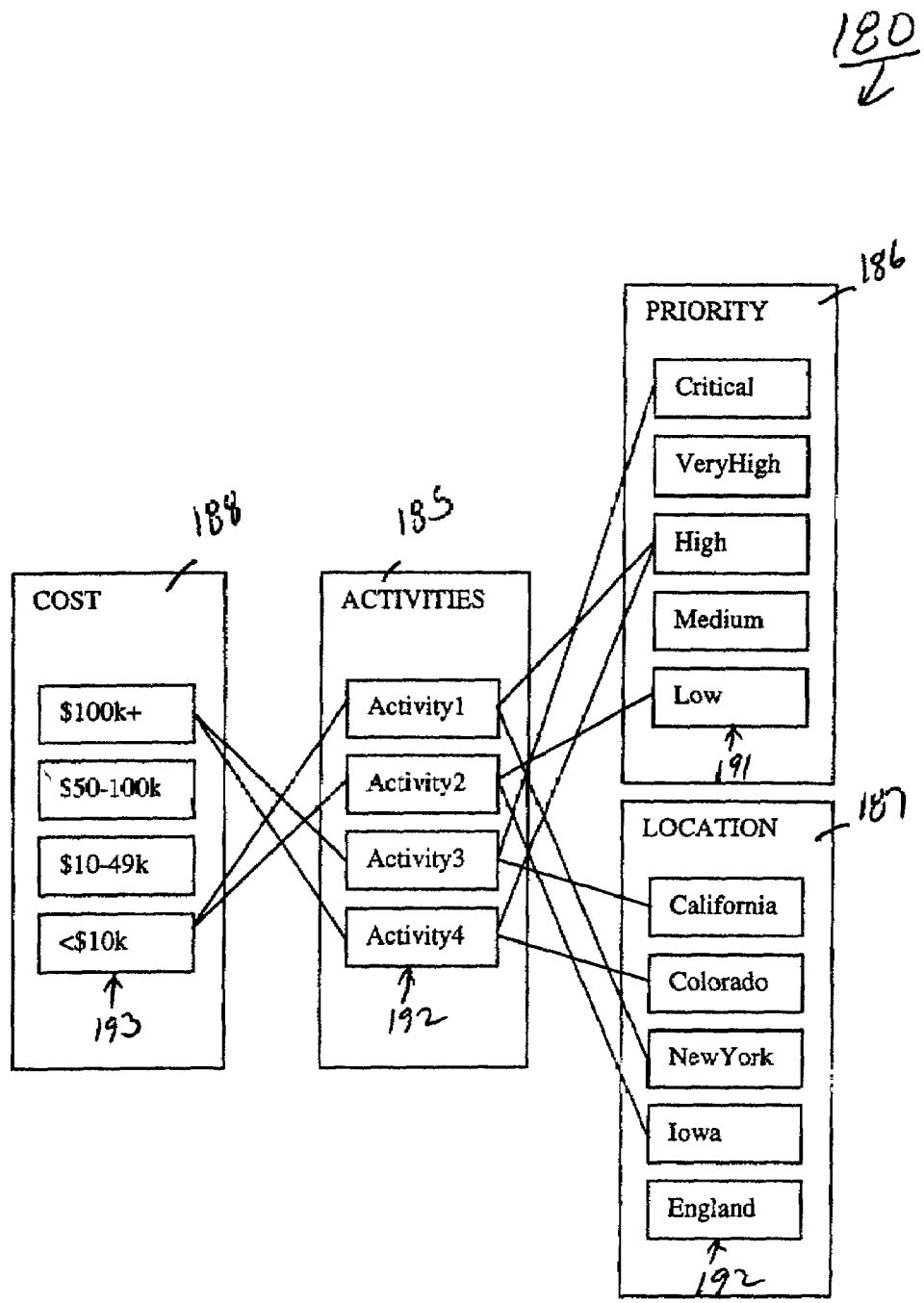
FIG. 17 shows links between categories in a method in accordance with the present invention.

Referring now to FIG. 17, a classification diagram 180 is illustrated. Classification diagram 180 shows the relationships between the data notes and labels for four categories. For example, the "activity" category 185 has activity labels 192. The "priority" category has priority labels 191, while the "location" category 187 has location labels 192. In a similar manner, the "cost" category 188 has cost labels 193. The links between the labels show how the method tracks relationships between labels and data. For example, the "activity 1" activity label has an association with the "high" priority label, the "New York" location label, and the "<$10k" cost label. Even though the classification diagram 180 indicates the sophisticated level of structure associating the labels and data, a user may select only a limited number of categories to display at one time, thereby greatly simplifying adding, viewing, using, and analyzing data notes.

Figures 18, 19:
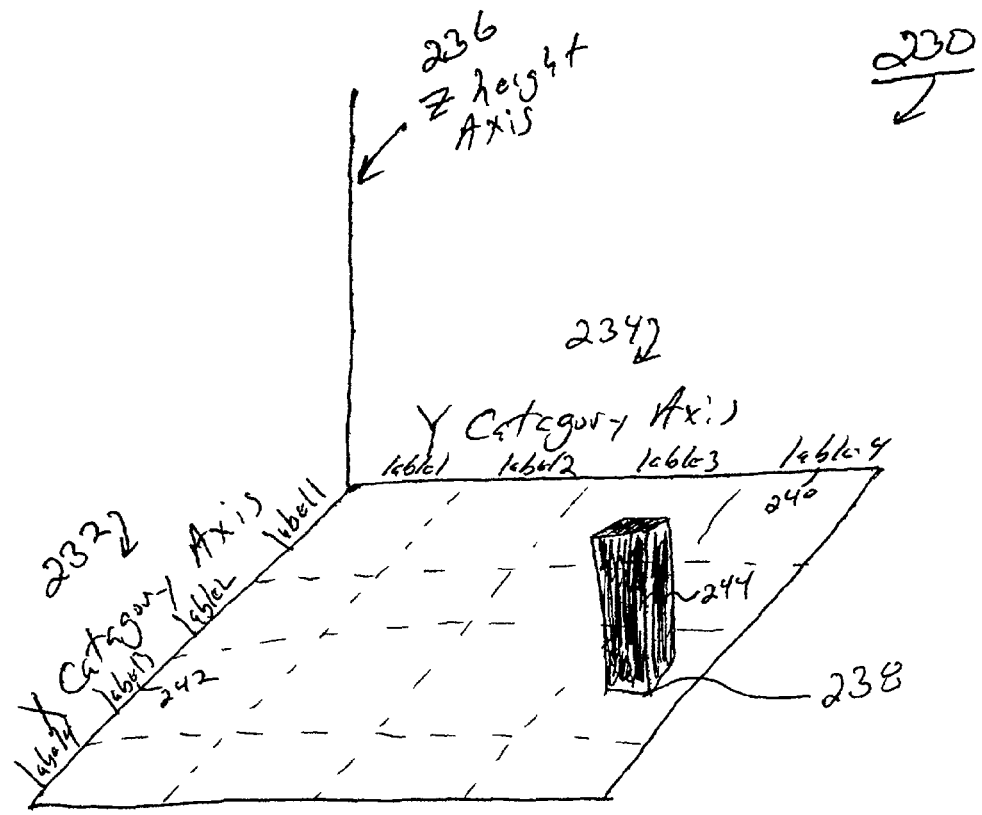
FIG. 18 shows a classification table in accordance with the present invention.
FIG. 19 shows a three-dimensional graph analyzing data objects in accordance with the present invention.

FIG. 18 shows a classification table 205. Classification table 205 is a flat file for maintaining and selectively using associations, and illustrates how associations are maintained. More specifically, FIG. 18 shows the relationships previously set forth in classification diagram 180. For example, the Activities category of FIG. 17 is displayed as row 223 of table 205. In this regard, each data note in the Activities category is now a heading for a column in the table 205. For example, data note "activity 1" heads column 208, data note "activity 2" heads column 209, data note "activity 3" heads column 210, and data note "activity 4" heads column 211. In the table 205, each column holds a set of associations for that column's respective data note. In this regard, data note "activity 1" has an association set 214, data note "activity 2" has an association set 215, data note "activity 3" has an association set 216, and data note "activity 4" has an association set 217.

Each association in each set, such as association 222, comprises an indicator for a category and an indicator for a label in that category. For example, association 222 indicates that the data note "activity 1" has an association with the "priority" category and the "high" label within that category. It will be appreciated that although table 205 maintains associations using a textual indicator, other mechanisms, such as numbers or abbreviations may be used. Also, although table 205 is a flat file system, it will be appreciated that other types of data systems may be used, such as a relational database.

In another way to add structure to data notes, a user may select a particular data note and access a "properties" control. For example, a user may graphically select a data note using the left button on a mouse, and then press the right mouse button to bring up a properties menu particular to the selected data note. The properties control could allow a user to define ancillary structure for the data note. Such ancillary structure could be added by having the user select checkboxes or other types or predefined criteria, or add free-form numbers or text. For example, each data note could allow a user to input a resource number, which could relate to cost or weeks of effort. It will be appreciated that more than one type of information could be entered as ancillary structure and associated with each data note in this manner.

Referring now to FIG. 19, a 3-dimensional display 230 is shown. Display 230 has an X axis 232 according to a first category, a Y axis 234 according to another category, and a Z axis 236 according to a third category. In this manner, a user is enabled to obtain a graphical view of the associations for three categories. It will be appreciated that the user has the flexibility to assign any available category to any of the X, Y, or Z axis. Also, for illustration purposes display 230 is shown as a 3-dimensional display, but other dimensions may be displayed or otherwise presented. For example, a forth dimension may be considered using a multiple dimensional analysis, with the forth dimension representing labels from a forth category. In a similar manner, size, shape, color, and movement may be used to indicate more complex multidimensional structures and diagrams.

In another use of display 230, the Z axis 236 or other higher-ordered axis is reserved for display of ancillary structure, as defined above. Such a display is particularly useful if the ancillary information is in the form of numerical data, such as a specific cost figure. In this manner, the display 230 provides a 3-D display where the X and Y axis intersect to form cells, such as cell 238. As shown, cell 238 represents a set of data notes, where each data note has an association with the "label4" 240 of the Y axis category, and an association with the "label3" 242 of the X axis category. In this respect, each cell in the display 230 represents the set of associated data notes where each data note is associated with the respective label on both the X axis and the Y axis. The Z axis height for each cell can be set to represent an aggregation of the numerical data from all the data notes associated with that particular cell. For example, bar 244 represents an aggregation of numerical data associated with all the data notes represented by cell 238. Using such an aggregation algorithm enables an efficient display of cost, resource, or other factor. It will be appreciated that other algorithms may be applied to set the Z axis height 236 to assist in particular decision analysis processes. For example, if each data note had an association that addressed schedule, then the aggregation algorithm could be made more sophisticated to account for the time value of money when displaying aggregated costs.

The data arrangement system 10 may be developed using standard programming techniques. For example, system 10 may be written in a Sun Microsystems Java-compliant environment to facilitate ease of use in a networked environment. Preferably, the system 10 is developed in a commonly used and familiar operating system, such as the Microsoft Windows.

Figure 20:
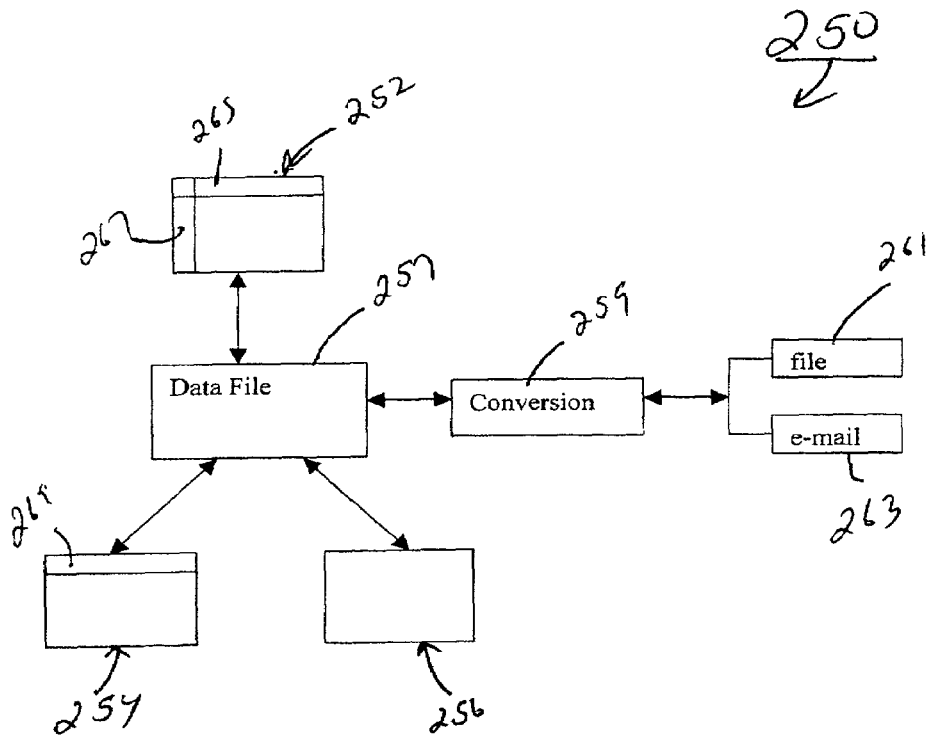
FIG. 20 is a block diagram of a method of graphical collaboration in accordance with the present invention.

Referring now to FIG. 20, a method of collaboration 250 is shown. The method of collaboration 250 enables multiple users to concurrently view and manipulate data notes. More particularly, method 250 shows a data arrangement 252 communicating to a data file 257 for displaying data notes. Data arrangement area 252 displays data notes with a two-dimensional structure defined by x-axis association 265 and a y-axis association 267. As described above, each axis is associated with a category, and category labels are used to delineate positions relative to each axis. Accordingly, each data note positioned in the data arrangement area 252 may be positioned in a cell where the data note indicates an association with two categories simultaneously.

In a similar manner data arrangement 254 also communicates with the data file 257 for displaying data notes. However, data arrangement area 254 only uses an x-axis association 269 for displaying data notes. In another example, data arrangement area 256 also is connected to data file 257, but displays the data notes without any displayed structure. Although the data arrangement areas 252, 254, and 256 may display the same data notes, each of the data arrangement areas may concurrently display the data notes with a different level of structure. For example, the user of data arrangement 256 may be most comfortable in dealing with completely free-form information, while a user of data arrangement 252 may be more constructive using a much more structured display and work area. Further, each of the data arrangement areas may select a different set of categories to use in displaying structures. As already described, that set may include no categories, in which case the data arrangement is in a free-form style. Alternatively, each of the data arrangement areas may have one or more categories for defining structure.

Since each of the data arrangement areas may be customized for a particular user, each user may select a desirable level and type of structure to view. For example, a person interested in accounting may want to view cost and schedule information, but may not want to view structure related to location. However, another simultaneous user responsible for resource allocation may view the same data notes, but with categories defining location and personnel assignments.

In a particular example of using method 250, one of the data displays is used to change or add a data note. For example, a user may add a new data note in data arrangement 252, and information indicative of the new data note will be reflected in data file 257. Method 250 will then use the modified information in data file 257 to update each of the other data arrangements 254 and 256. In this way, all data arrangements viewing data file 257 view current and updated information, but each user selects the level and type of structure to organize the view of the data notes. The updated information is presented to the data arrangements substantially simultaneously, which means that the update is accomplished in a near real-time fashion, but with normal and expected system delays. For example, it will be appreciated that certain delays for processing, storage, and transmission will be encountered, and some of the delays may include queuing and buffering delays. Typically, it could be expected that the data arrangements would be updated within less than a few seconds of a change or addition being made, but transmission and processing delays may extend the delay. However, a delay of several seconds would still provide a useful and efficient collaboration system.

It will be appreciated that the data file 257 may be provided on a central server system, or may be resident on one or more distributed computer systems. In the same regard, the data arrangements such as data arrangements 252, 254, and 256 may be generated by a central server system, or may be generated by individual computers such as a personal computer.

In a particular application of method 250, a user may make a change to a data object in the data file 257 by providing input in the form of a file 261 or an e-mail 263. For example, a remote user may have information regarding cost for particular data objects. The user may generate an e-mail describing changes or additions for a particular data object, and the e-mail may be received by a conversion utility 259. The conversion utility would accept the e-mail input and modify the indicated data object or objects, and update the information regarding the data object in the data file 257. The modified data object would then appear substantially simultaneously in the data arrangement 252, 254, and 256. Conversely, a particular user may be interested in knowing when certain data objects were changed. For example, this same accounting user may be interested to know when cost projections have been modified in any data object. In this way, if any user, such as a user at data arrangement 252, adjusts cost accounting for a data object, the conversion utility 259 could detect the change and formulate an e-mail indicative of the change. The conversion utility 259 could then forward the e-mail to the e-mail system and forward the e-mail to the user.

In another example, a particular user may be comfortable working in a well-defined application, such as a spreadsheet. The user may provide their input to the system by exporting a file from the spreadsheet application and transmitting the file 261 to a conversion utility 259. The conversion utility 259 could take the information from file 261 and put it in a format to modify or add data objects in data file 257. In this way each of the data arrangements could substantially simultaneously reflect changes input from a data file 261. Conversely, changes made at the data arrangement areas 252, 254, 256 would be stored in data file 257, and the conversion utility 259 could convert the data objects of interest into a file compatible with a particular spreadsheet program. It will be appreciated that the conversion utility 259 could be modified for many different e-mail systems and application programs.

In another possible variation, the conversion utility 259 could be linked to other types of dynamic information, such as an Internet site or to another project document. When a change is detected in a particular URL, or to a particular document, the conversion utility could be constructed to add or modify a data object to reflect the change. In a similar manner, the conversion utility could detect a change in a data object, and provide a link to a web site or other documents to automatically provide notice of the chance. It will be appreciated that many alternatives exist to enable the conversion utility to accept modification data from remote sources and systematically update or add data objects. Conversely, many alternatives exist to enable the conversion utility to accept modification data from data objects, and systematically update remote sources.

Figure 21:
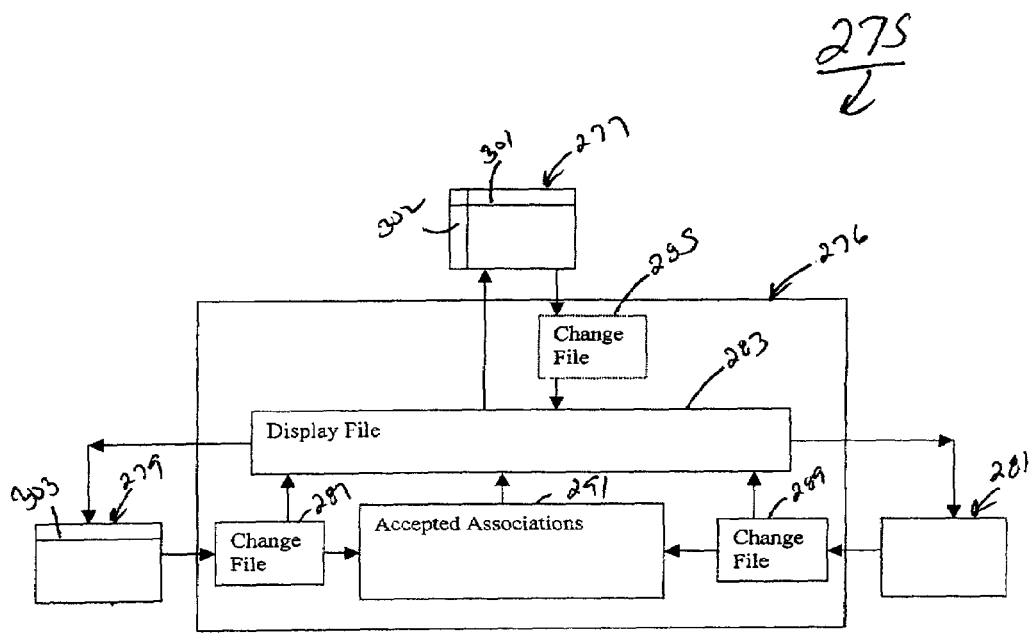
FIG. 21 is a block diagram of another method of graphical collaboration in accordance with the present invention.

Referring now to FIG. 21, another method of collaboration 275 is described. Similar to method 250 described above, method 275 has a data arrangement 277 having an x-axis association 301 and a y-axis association 302. Method 275 also has a data arrangement 279 having only an x-axis association 303, and another data arrangement area 281 in a free form arrangement. However, method 275 has a display manager 276 for tracking and providing indications of additions and modifications to data objects. Display manager 276 has a display file 283 that provides information to the connected data arrangements. Data objects stored in the display file would thereby be displayed, with their desired level of structure, at each of the data arrangement displays.

Each of the data arrangements has an associated change file. For example, data arrangement 277 has a change file 285, data arrangement 279 has change file 287, and data arrangement 281 has change file 289. When a user at a particular data arrangement adds a data object or modifies a data object, the addition or modification is indicated in its respective change file. The change file then adds an indicator to the added or modified data object and passes the added or changed data object to the display file 283. The added or modified data object may then be displayed on the data arrangements. For example, if a user adds data arrangement area 277 changes a data object, the change would be noted in change file 285 and passed to display file 283. Since the data object now has an indicia that it has been modified, the other data arrangement areas 279 and 281 would be presented with an indicator showing the data object has been proposed to be modified or is proposed to be added. It will be appreciated that several alternatives for such indicia exists, such as adding a textual description, changing color, changing size, or other such alteration to the data objects characteristics. It will also be appreciated that the change indicia may be removed upon various occurrences. For example, the change indicia could be removed after acknowledgement by a particular user that the change or addition has been made, or the change indicia may be removed only after the change or addition has been authorized. It will be appreciated that the authorization may come from an individual, a team of users, or from a systematic process.

Method 275 also contemplates that users may have varying levels of access and security. For example, the user having displayed 277 may be able to make changes directly and have those changes accepted by the system, while users at data arrangements 279 and 281 would need their additions or modifications approved by an approval process. In this regard, the change file 287 and 289 use an accepted association file 291 to maintain which of the proposed changes or additions have been accepted and approved. Once accepted and approved, then the added or modified data objects may be presented to the display file and presented to all active data arrangements. It will be appreciated that several levels of security and access may be provided, such as full access, edit access, add access, or read-only access.

Figure 22:
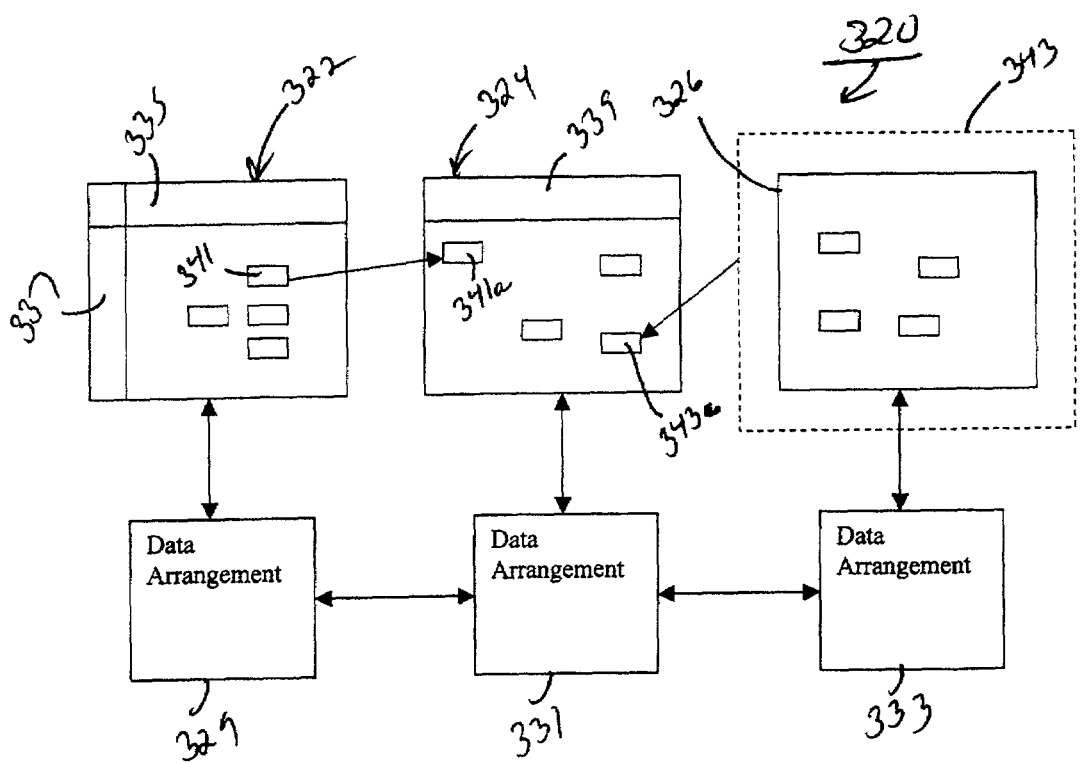
FIG. 22 is another block diagram of a method of graphical collaboration in accordance with the present invention.

Referring now to FIG. 22, another method of collaboration 320 is shown. Method 320 provides data arrangement 322 having an x-axis association 335 and a y-axis association 337. Data arrangement 322 has several data objects, including data object 341. Data object 341, as with the data objects, is stored in data arrangement file 329.

Method 320 has another data arrangement 324 having an x-axis association 339. Data arrangement 324 has several data objects, with these data objects stored in data arrangement 331. In this regard, data arrangement 322 and data arrangement 324 are for different projects, and are not displaying the same set of data objects. However, it may be useful and more efficient for data arrangement 324 to include a particular data object previously defined, such as in connection with data arrangement 322. For example, if a particularly complex financial data object has been developed for data arrangement 322, then that data object may be "imported" into data arrangement 324. In method 320, the data object 341 in data arrangement 322 has been imported into data arrangement 324 and is shown as data object 341a. The importation was accomplished via a communication between data arrangement file 329 and data arrangement file 331. Once the import has been done, it will be appreciated that the import may provide for either a linked or an unlinked updating. For example, at a later time if the user of data arrangement 322 makes a change to data object 341, the system could be configured to automatically update data object 341a, or to seek approval from the user of data arrangement 329 before making an update to data object 341a, or not update data object 341a at all.

Method 320 also contemplates that a group of data objects may be represented by a single data object. In FIG. 22, data arrangement 326 has several data objects stored in its data arrangement file 333. A set of the data objects is selected and presented as group element 343. Here, group 343 includes four individual data objects. Group element 343 could represent the manufacturing schedule for a particular product, for example. The user of data arrangement 339 may desire to link to the manufacturing schedule, but may not desire to have any substantial detail disclosed. In this regard, the data arrangement 339 may "import" the group element 343 and present it on the data arrangement 339 as a single object data 343a. Accordingly, when the user of data arrangement 326 makes a change to any data object in the grouped element 343, that change may be reflected, either automatically or after an approval process, in data object 343a. In a similar manner, if user of data arrangement 339 makes a change affecting the manufacturing schedule 343a, the change may be reflected back in the data objects on data arrangement 326. Of course, the change to data arrangement 326 could be after an approval process or occur automatically.

In an example of the collaboration system, the collaboration process is a server-side framework. The framework allows multiple distributed clients to view and modify the same collaborative document in near real time as changes or additions are made by other users. For example, the collaboration framework enables a user to make live updates of completed dates and add detail to data notes, and those changes may be reflected in the displays of other users, with only a systemic delay.

The collaboration framework achieves this by allowing clients to share their modifications, in near real time, with other clients. When a user modifies the document, that collaborative edit is substantially immediately routed to all other interested parties via a collaboration server. Rather than sending the entire data set to every other party, only the change is propagated to clients, minimizing network traffic and allowing highly responsive interaction. In a specific implementation, changes are propagated as proposed changes that are presented to users for acceptance. Using such proposed changes allows inputs from all users to be accommodated, but reduces errors from simultaneous changes and possible inconsistent displays. It will be appreciated that other techniques exist to handle simultaneous changes in a collaboration system to address inconsistent display issues.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method for collaborating, comprising:
   generating a data object on a free-form display area;
   storing the data object in an object file;
   assigning a set of associations to the data object, each association relating to a different high-level concept for the data object;
   selecting a first group of associations, the first group being a subset of the set of associations;
   selecting a second group of associations, the second group being a subset of the set of associations, and being different than the first group of associations;
   displaying a first display of the data object using the first group of associations;
   displaying a second display of the data object using a second group of associations;
   a conversion utility receiving information from an e-mail;
   the conversion utility using the e-mail information to change the data object;
   updating substantially concurrently the first display and the second display to reflect the changed data object; and
   wherein the first display and second display occur substantially simultaneously.

2. The method according to claim 1, further including changing the data object in the object file, and updating substantially simultaneously the first display and the second display to reflect the changed data object.

3. The method according to claim 1, further including changing the data object using one of the displays, and updating substantially simultaneously the other display.

4. The method according to claim 3, further including storing the changed data object in a change file, and updating the object file to reflect the change after the change has been approved.

5. The method according to claim 4, further including associating a change indicia with the data object so that the displays indicated that the changed data object is in the change file, and removing the change indicia after the change has been approved.

6. The method according to claim 1, further including proposing to change the data object using one of the displays, and updating substantially simultaneously the other display to indicate that it has been proposed to change the data object.

7. The method according to claim 1, where the first group of associations consists of 0 associations selected from the set of associations, and the first display displays the data object in a free-form environment.

8. The method according to claim 1, where the first group of associations consists of 1 association selected from the set of associations, and the first display displays the data object with the 1 association as a axis.

9. The method according to claim 1, where the first group of associations consists of 2 associations selected from the set of associations, and the first display displays the data object with the 2 associations each acting as an axis for the first display.

10. The method according to claim 1, further including changing the data object in the object file, updating substantially concurrently the first display and the second display to reflect the changed data object, generating information for an e-mail, and sending the e-mail to a pre-defined address to indicate the data object has been changed.

11. A collaboration system, comprising:
    a plurality of data displays, the data displays being operably coupled for concurrent display;
    a data object displayable on the plurality of displays, the data object being assigned a set of associations each representing a high level concept;
    a first one of the plurality of displays configured to present the data object in a free-form display area with no associations structuring the data object;
    a second one of the plurality of displays configured to present the data object in a display area with at least one of the associations structuring the data object;
    a conversion utility configured to send an e-mail to an e-mail process that causes the data object to be updated in the first display and the second display; and
    wherein both the first display and the second display present the data object concurrently.

12. The collaboration system according to claim 11, wherein the free-form display area is arranged as a metaphor for a whiteboard, and the data object is arranged as a metaphor for a sticky note.

13. The collaboration system according to claim 11, wherein the at least one of the associations is assigned to an axis of the second display so that the data object is structured pursuant to axis labels.

14. The collaboration system according to claim 11, wherein a change made to the data object in one of the displays causes the change to be reflected in the other display substantially concurrently with the change being made.

15. The collaboration system according to claim 11, wherein a change made to the data object in one of the displays causes the change to be reflected in the other display after the change has been authorized.

16. A method for collaborating, comprising:
generating a data object on a free-form display area;
storing the data object in an object file;
assigning a set of associations to the data object, each association relating to a different high-level concept for the data object;
selecting a first group of associations, the first group being a subset of the set of associations;
selecting a second group of associations, the second group being a subset of the set of associations, and being different than the first group of associations;
displaying a first display of the data object using the first group of associations;
displaying a second display of the data object using a second group of associations;
wherein the first display and second display occur substantially simultaneously;
changing the data object in the object file;
updating substantially concurrently the first display and the second display to reflect the changed data object;
a conversion utility detecting the change and generating information for an e-mail;
sending the e-mail to a pre-defined address to indicate the data object has been changed.

17. The method according to claim 16, further including changing the data object in the object file, and updating substantially simultaneously the first display and the second display to reflect the changed data object.

18. The method according to claim 16, further including changing the data object using one of the displays, and updating substantially simultaneously the other display.

19. The method according to claim 18, further including storing the changed data object in a change file, and updating the object file to reflect the change after the change has been approved.

20. The method according to claim 19, further including associating a change indicia with the data object so that the displays indicated that the changed data object is in the change file, and removing the change indicia after the change has been approved.

21. The method according to claim 16, further including proposing to change the data object using one of the displays, and updating substantially simultaneously the other display to indicate that it has been proposed to change the data object.

22. The method according to claim 16, where the first group of associations consists of 0 associations selected from the set of associations, and the first display displays the data object in a free-form environment.

23. The method according to claim 16, where the first group of associations consists of 1 association selected from the set of associations, and the first display displays the data object with the 1 association as a axis.

24. The method according to claim 16, where the first group of associations consists of 2 associations selected from the set of associations, and the first display displays the data object with the 2 associations each acting as an axis for the first display.

* * * * *